(12) United States Patent
Turcotte et al.

(10) Patent No.: US 6,235,217 B1
(45) Date of Patent: *May 22, 2001

(54) MONOCARBOXYLIC ACID BASED ANTIFREEZE COMPOSITION

(75) Inventors: David E. Turcotte; Arnold L. Coffey, Jr.; Alden W. Olsen, all of Lexington, KY (US); Michael A. Dituro, Huntington, WV (US); Carl R. Stephens, Ashland, KY (US)

(73) Assignee: Ashland, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/510,880

(22) Filed: Feb. 23, 2000

Related U.S. Application Data

(63) Continuation-in-part of application No. 09/135,138, filed on Aug. 17, 1998, now Pat. No. 6,126,852.

(51) Int. Cl.⁷ ....................................................... C09K 5/00
(52) U.S. Cl. ................................................. 252/76; 252/79
(58) Field of Search .......................................... 252/76, 79

(56) References Cited

U.S. PATENT DOCUMENTS

| | | | |
|---|---|---|---|
| 4,338,209 | * 7/1982 | Manabe et al. | 252/75 |
| 4,455,248 | * 6/1984 | Wood | 252/75 |
| 4,561,990 | * 12/1985 | Darden | 252/75 |
| 4,587,028 | * 5/1986 | Darden | 252/76 |
| 4,588,513 | * 5/1986 | Triebel et al. | 252/75 |
| 4,647,392 | * 3/1987 | Darden et al. | 252/75 |
| 4,657,689 | * 4/1987 | Darden | 252/75 |
| 4,759,864 | * 7/1988 | Van Neste et al. | 252/75 |
| 4,851,145 | * 7/1989 | Van Neste et al. | 252/75 |
| 4,946,616 | * 8/1990 | Falla | 252/75 |
| 5,366,651 | * 11/1994 | Maes et al. | 252/75 |
| 5,422,026 | * 6/1995 | Greaney | 252/76 |
| 5,925,173 | * 7/1999 | Fost et al. | 252/76 |

* cited by examiner

Primary Examiner—Necholus Ogden
(74) Attorney, Agent, or Firm—Carrithers Law Office; David W. Carrithers

(57) ABSTRACT

A monobasic carboxylic acid is used with low levels of molybdate and a triazole compound to produce a well balanced corrosion inhibiting formulation with very low solids to minimize potential deposits and exhibit surprising long life characteristics in engine coolant applications.

46 Claims, 2 Drawing Sheets

MONOCARBOXYLIC ACID BASED ANTIFREEZE COMPOSITION

This application is a Continuation-In-Part of U.S. patent application Ser. No. 09/135,138 filed on Aug. 17, 1998 now U.S. Pat. No. 6,126,852 hereby incorporated by reference. This application also claims priority from application PCT/US9823876 filed on Nov. 5, 1998 and is hereby incorporated by reference.

BACKGROUND OF THE INVENTION

Technical Field

This invention relates to an acid based antifreeze formulation for inhibition and prevention erosion and corrosion of aluminum and the corrosion of other metals exposed to an aqueous liquid in automotive coolant systems. The formulation further inhibits mineral scale. Traditionally antifreeze/coolant is sold at nearly one-hundred percent glycol content. This concentrated packaging allows for flexibility so that the user can dilute the antifreeze/coolant, as needed, with available water to obtain the required freeze/boil protection. However, corrosion protection is needed over the entire dilution range.

In modern automotive engineering, many engine components are fabricated from aluminum. Engine coolants, primarily ethylene glycol or propylene glycol based solutions, must transfer heat from operating aluminum engines while inhibiting corrosion. Older automotive engines did not have aluminum components and thus, the traditional antifreeze/coolant compositions may produce corrosion in heat rejecting aluminum or aluminum alloy components. The cavitation erosion-corrosion of aluminum water pumps upon exposure to aqueous systems such as water-cooled internal combustion engine coolants is a relatively new development.

DESCRIPTION OF THE PRIOR ART

Automotive engine cooling systems consist of many metals including aluminum, steel, cast iron, brass, copper and solder. Engine coolants must not only provide freeze protection but corrosion inhibition as well. Often the components are thin walled for improved heat transfer making them more vulnerable to corrosive attack and subsequent failure. Corrosion products and deposits can interfere with heat transfer. Ultimately overheating and engine failure from thermal related stresses are possible.

Traditionally engine coolants based on inorganic components like silicates, phosphates, nitrates, borates and nitrites have been used. Concerns due to inhibitor depletion, particularly silicates have lead to concerns about lifetime. Also, high solids loading from inorganic salts presents potential deposit issues. Amine and nitrite compounds, which are often employed as corrosion inhibitors in antifreeze formulations may form potentially dangerous nitroso compounds when used together. Antifreeze formulations containing phosphates are often diluted with hard water which results in precipitation of insoluble alkali earth phosphate salts from the aqueous antifreeze solution. The precipitation may cause depletion of the phosphate in solution and a decrease in corrosion protection with the antifreeze solution. The precipitating solids may scale and plug passages within the engine coolant system. Moreover, several European automobile manufacturers have banned the use of phosphate-containing antifreeze based on silicate formulations due to hard water compatibility problems.

Recently the automotive industry has developed engine coolants based primarily on carboxylic acid technology. Many U.S. and foreign patent references disclose the use of various monobasic or dibasic acids or salts as corrosion inhibitors. For example, in U.S. Pat. No. 4,647,392, Darden teaches a synergistic combination of 0.1 to 15 weight percent of $C_5$ to $C_6$ aliphatic monobasic acid with the same amount of $C_5$ to $C_6$ dicarboxylic acid and 0.1 to 0.5 weight percent of a hydrocarbonyl triazole. The triazole is typically tolytriazole or benzotriazole. The acids are present as salts in an alkaline solution. In U.S. Pat. No. 4,946,616, Falla teaches a mixture of two aliphatic dicarboxylic acids with a hydrocarbyl triazole. In U.S. Pat. No. 4,587,028, Darden discloses two to five weight percent of an aromatic monocarboxylic acid, benzoic acid, with 0.5 to 1.5 weight percent of a $C_8$ to $C_{12}$ aliphatic carboxylic acid and an alkali metal nitrate. British military specification TS 10177 (Al39), March of 1978, call for 4 to 4.5 weight percent of sebacic acid(aliphatic dicarboxylate) and 0.25 to 0.30 weight percent of benzlytriazole. In U.S. Pat. No. 4,382,008, Boreland has combined an aromatic monocarboxylic acid with $C_7$ to $C_{13}$ dibasic organic acids and conventional inhibitors such as borate and silicate to prepare formulations. However, the use of these additives increase the overall cost of the formulation.

U.S. Pat. No. 5,366,651 by Maes et al. emphasizes that imidazole serves as a buffer to assist in pH control and serve as the buffer in carboxylic acid based antifreeze formulations. Imidazole is an unsubstituted triazole containing two nitrogen molecules providing a very active triazole molecule to combine with hydrogen providing a neutralizing or buffering capability.

In summary, a wide number of organic acids have been successfully used in various combinations among themselves and with more common components. Typically acids are used at the several percent level if common inhibitors are not present. The presence of hydrocarbyl triazoles indicates that yellow metals such as copper and brass, and solder must be protected separately. The carboxylates are primarily inhibiting ferrous metals and aluminum in these formulations. Despite the successful lab data reported, questions remain about the ability of full acid technologies like Darden and Falla to protect solder and prevent cavitation erosion-corrosion on aluminum in engine applications. Further, the addition of large quantities of inorganic salts to correct these deficiencies negates the low solids benefit.

SUMMARY OF THE INVENTION

The present invention has met the above-described need by providing an antifreeze/coolant composition using a combination of an aliphatic carboxylic acid, hydrocarbyl tolytriazole, and low levels of molybdate additives which reduce corrosion over the entire dilution range without creating precipitates. This composition is soluble in water, alcohol, and alcohol/water mixtures, is compatible with other commonly used antifreeze/coolant components, does not corrode or damage automotive cooling systems and is effective at relatively low concentrations. In addition, the present corrosion inhibition formulations are effective in reducing corrosion in the entire range of cooling system metals, including heat rejecting aluminum, aluminum alloys, copper, steel, cast iron, brass, solder and the like.

The instant antifreeze formulation having a mixture of ethylene or propylene glycol, monobasic aliphatic organic acid, azoles, and low levels of molybdates may also provide a protective effect against the cavitation corrosion of aluminum in aqueous liquids reducing the corrosion rate which is effective at relatively low concentrations and varying pH ranges. The combination of monobasic aliphatic organic acid, hydrocarbyl tolytriazole, and low levels of molybdates not only significantly reduces glycol based coolant cavitation erosion-corrosion, heat rejecting aluminum corrosion, and hard water precipitates and scale, it has been discovered that the combination leads to improvement in aluminum corrosion protection and coolant life when utilized with selected amounts of the above-identified additives. Thus, the formulation is particularly suitable for automotive gasoline and diesel engine coolant applications.

It is an object of the present invention to provide corrosion inhibition formulations for antifreeze/coolant compositions for reducing glycol based coolant cavitation erosion-corrosion.

It is another object of the present invention to provide corrosion inhibition formulations for antifreeze/coolant compositions utilizing an acid based formula for enhancing coolant stability providing an improvement in coolant life.

It is another object of the present invention to provide corrosion inhibition formulations which reduce corrosion over the entire dilution range of antifreeze/coolant compositions without creating precipitates.

It is an additional object of the present invention to provide corrosion inhibition formulations which are effective in reducing corrosion in the entire range of cooling system metals.

It is an additional object of the present invention to provide corrosion inhibition formulations which are effective in reducing heat rejecting aluminum corrosion.

It is an additional object of the present invention to provide corrosion inhibition formulations which are effective in reducing hard water precipitates and scale.

It is a further object of the present invention to provide corrosion inhibition formulations which are soluble in alcohol, alcohol/water mixtures and water alone.

It is an object of the present invention to provide corrosion inhibition formulations which are compatible with commonly used antifreeze/coolant components.

It is another object of the present invention to provide corrosion inhibition formulations which are effective at relatively low concentrations.

It is an additional object of the present invention to utilize a monobasic aliphatic organic acid a d an hydrocarbyl triazole to allow a low level of molybdate to be utilized in the corrosion inhibition formulations to reduce the corrosion.

It is a further object of the present invention to maximize the protection of ferrous metals and minimize pitting thereof.

It is a further object of the present invention to utilize molybdate to protect against erosion and cavitation of aluminum.

These and other objects of the present invention will be more fully understood from the following description of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

Figure 1:
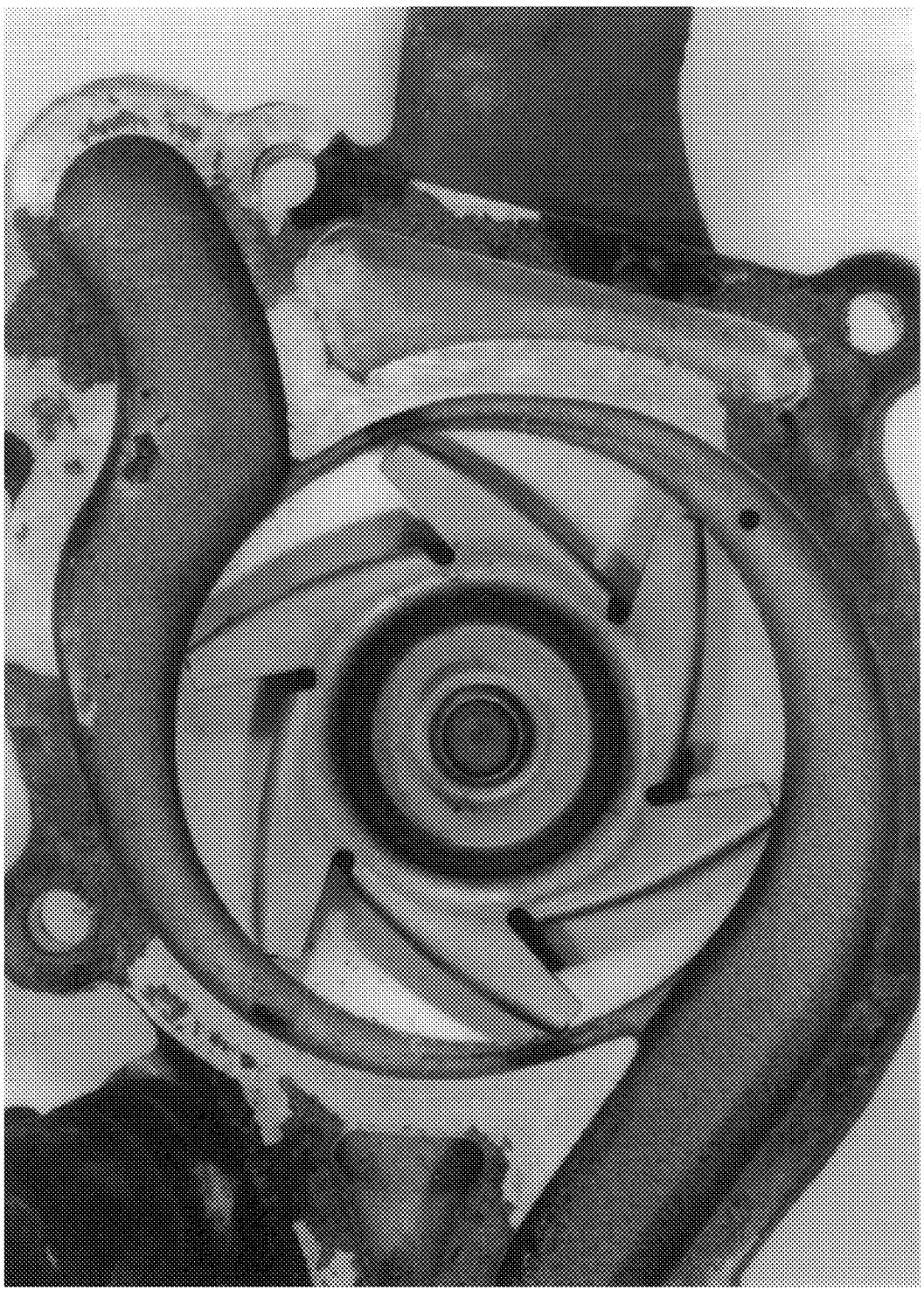
FIG. 1 shows the engine water pump and timing cover protected with the Formula "A" composition of the instant invention containing the monobasic aliphatic organic acid with molybdate and a hydrocarbyl triazole wherein the aluminum is well protected with no pitting, blackening or corrosion.

A monobasic carboxylic organic acid is used with low levels of molybdate and a hydrocarbyl triazole in glycol mixtures to produce a well balanced antifreeze corrosion inhibiting formulation with very low solids to minimize potential deposits and surprising long life characteristics in engine testing. Moreover, the formulation according to the instant invention lead to improvement in aluminum corrosion protection and prolonged coolant life as compared to conventional silicon based coolants. In addition, the present corrosion inhibition formulations are effective in reducing corrosion in the entire range of cooling system metals, including heat rejecting aluminum, aluminum alloys, copper, steel, cast iron, brass, solder and the like. This formulation is soluble in alcohol, alcohol/water mixtures and in water alone and exhibits excellent stability characteristics.

The most preferred antifreeze/coolant composition is an acid-based composition having a pH of about 6.0 to about 12.0 and having about 93% antifreeze grade glycols and about 4 to 7 percent corrosion inhibitors, with the balance being water.

The freezing point depressant utilized in the antifreeze compositions of the invention can be any suitable water-soluble liquid alcohol used heretofore in formulating antifreeze compositions. The water-soluble alcohol contains 1 to about 4 carbon atoms and 1 to about 3 hydroxy groups. The glycols or glycol ethers which may be used as major components in the present invention include glycol monoethers such as the methyl, ethyl, propyl, and butyl ethers of ethylene glycol; diethylene glycol, propylene glycol, and dipropylene glycol.

Ethylene glycol or propylene glycol is preferred as the freezing point depressant and especially the commercially available mixtures containing largely ethylene glycol and a small amount of diethylene glycol. The commercial mixture generally contains at least 85 to 95 percent by weight of ethylene glycol with the remainder being diethylene glycol and small amounts of substances which are incidentally present such as water. Other water-soluble liquid alcohol can be admixed with ethylene glycol but such mixtures usually are not preferred. Inexpensive commercially available water soluble alcohols can also be used such as methyl, ethyl, propyl, and isopropyl alcohol alone or in mixtures.

The concentrated corrosion inhibitor formulations of the present invention is a water-based mixture of monobasic aliphatic organic acid, azoles, particularly hydrocarbyl triazole, and low levels of molybdenum compounds. Optionally, other components including defoamers, dyes, bittering agents, biocides, and the like may be added to the present formulation. The azoles include tolytriazole, benzotriazole, mercaptobenzothizole including mixtures and other substituted azoles. Suitable defoamers include PLURONIC® L-61, PATCOTE® 415 and other surfactants including silicone types. The corrosion inhibitor formulations are compatible with other commonly used antifreeze/ coolant components and are effective at relatively low concentrations.

The most important preferred ingredients of the antifreeze formulation, whether mandatory or optional, are discussed below:

MONOBASIC CARBOXYLIC ACID

The monobasic acid component of the above-identified antifreeze formulation may be any $C_3$–$C_{16}$ monobasic carboxylic acid or the alkali metal salt thereof; however, in order to maintain the desired solubility, the preferred embodiment of the instant invention utilizes an aliphatic monobasic carboxylic acid components or the alkali metal salt there of in the range of from about $C_6$ to about $C_{12}$. Preferably, the monobasic carboxylic acids include one or more of the following acids or isomers: hexanoic, heptanoic, isoheptanoic, octanoic, 2-ethylhexanoic, nonanoic, decanoic, undecanoic, dodecanoic, neodecanoic, and/or combinations thereof. The preferred composition uses Octanoic and 2-ethylhexanoic as the aliphatic monobasic acids. Any alkali metal hydroxide or ammonium hydroxide may be used to form the monobasic salt; however, sodium and potassium are preferred, and the potassium salt is most preferred. The monobasic acid or alkali metal salt component of the present invention is present in a concentration of from about 0.1 to about 10.0 weight percent, more preferably from about 1.0 to about 6.0 weight percent, and most preferably from about 2.0 to about 4.0 weight percent, based upon the total weight of the concentrate composition (the weight percent calculated based upon the free acid).

AZOLE ADDITIVES

Azoles are present in the formulation to inhibit corrosion of yellow metal like copper and brass. Brass thermostats and radiator caps are common as well as copper and brass radiators. The hydrocarbyl triazole of the instant invention is preferably an aromatic triazole or alkyl-substituted aromatic triazole, preferably benzotriazole or tolyltriazole. The preferred hydrocarbyl is tolyltriazole. The azole compound providing protection for copper and brass from corrosion is selected from among the water-soluble triazoles, pyrazoles, isooxazoles, isothiazoles, thiazoles, thiadiazole salts, and the like. Generally, the alkali metal salts are used. Specific preferred azole compounds include 1, 2, 3-benzotriazole; 1, 2, 3-tolyltriazole; sodium tlytriazole, and sodium 2-mercaptobenzothiazole. Azole compounds suitable in the present invention include, salts of mercaptobenzothiazole, salts of tolytriazole, benzotriazole, mixtures thereof and the like; however, the preferred composition uses hydrocarbyl triazole. Typically, these azoles are used in a fifty percent solution in caustic.

It is contemplated that certain triazoles such as sodium 2-mercaptobenzimidazole and imidazole define unsubstituted triazoles containing two nitrogen molecules which provide a very active triazole molecule to combine with hydrogen providing a neutralizing or buffering capability when used with a carboxylic acid. The hydrocarbyl triazole and other azole compounds utilized in Applicants' preferred embodiment contains azole compounds containing three nitrogen molecules and/or are more substituted and less active than the imidazole and therefor less corrosive to engine components and seals. Other than the imidazole, the selected less active and more stable azole compounds in the instant formulation are important as corrosion inhibitors for protecting yellow metal.

The azoles are preferably present in the formulation in an amount of about 0.01 to about 5.0 percent by weight, and more preferably in an amount of about 0.01 to about 1.0 percent by weight. Generally, an azole compound, such as sodium tolytriazole 50% is used in amounts of about 0.1 parts to about 0.5 parts by weight, based on 100 parts by weight of the aqueous liquid.

MOLYBDATE ADDITIVES

The water-soluble molybdate which is preferred for use in the aqueous systems of the present invention can be any salt of molybdic acid which is readily soluble in water. These include both alkali metal and alkaline earth metal molybdates as well as ammonium molybdate, the term "alkali molybdate" being used in a broad sense so as to include alkali metal, alkaline earth metal and ammonium molybdates. Examples of useful molybdates are sodium molybdate potassium molybdate, lithium molybdate and ammonium molybdates including ammonium dimolybdate and ammonium heptamolybdate. Alkali molybdate compounds, sodium molybdate, sodium molybdate dihydrate, molybdenum trioxide, heteropolymolybdates, and potassium molybdate are preferred because of their availability and compatibility with the aqueous system as well as for economic reasons. Typically, concentrations of the molybdate ion are below about 0.5 parts by weight per 100 parts by weight of aqueous liquid can be employed, whereby concentrations of molybdate ion above this limit normally do not provide significant improvements in the inhibitive characteristics or the aqueous system and are undesirable for economic reasons; however, in the instant invention it is believed that the molybdenum aids in the attachment and formation of the protective film upon the surface of the metal requiring protection. Particularly under rapid corrosion conditions such as the cavitation erosion corrosion of aluminum.

Transition metal compounds suitable for use in the present invention include, disodium salt dehydrate of molybdic acid, sodium molybdate $2H_2O$, molybdenum trioxide, silicoheteropolymolybdates, phosphoroheteropolymolybdates, mixtures thereof and the like. Any compatible transition metal may be used, including for example, molybdate, cobalt, cerium, mixtures thereof and the like. In addition, any acid salt may be used including sodium, potassium, lithium, calcium, magnesium and the like. The most preferred transition metal compound is the disodium salt dihydrate of molybdic acid or sodium molybdate $2H_2O$.

Transition metal acids are used to inhibit corrosion in formulations of the present invention. The transition metal compound is preferably present in the formulation in an amount of about 0.001 to about 5.0 percent by weight, and more preferably in an amount of about 0.01 to about 1.0 percent by weight. The molybdate ion is employed in amounts so as to provide a concentration in the aqueous system of at least about 0.001 parts by weight per 100 parts by weight of aqueous liquid. Preferably about 0.005 to about 0.5 parts by weight per 100 parts by weight of molybdate based upon said aqueous liquid are employed.

The addition of a selected amount of molybdate to the present composition provides a means for obtaining an acid based antifreeze coolant composition at a decreased cost as compared to other aliphatic monobasic antifreeze formulations. Moreover, acid based antifreeze compositions are very aggressive with respect to lead solder whereby a selected amount of molybdenum as exhibited by the instant invention serves to minimize if not to eliminate the deficiency of acid based composition with respect to lead solder.

pH CONTROLLING COMPOUNDS

The preferred embodiment of the silicate free antifreeze composition uses potassium hydroxide at 45 percent concentration in a range of from about 0.5 to 10.0 weight percent, more preferably in a range of from about 1.0 to 5.0 weight percent, and most preferably from about 2.5 to 3.0 weight percent to achieve the desired ph of about 6.0 to 12.0, and preferably from between about 8.0 to about 9.0. Other pH adjusting or controlling compounds may be added such as basic and/or acidic compounds, i.e. NaOH, KOH or NH$_4$OH, and mineral or organic acids, i.e., HCl, H$_2$SO$_4$, or acetic acid, or buffering agents such as borates, to maintain the pH in the range of about 7.0 to 10.5.

DEFOAMERS

Any suitable defoamer, well known in the art, is suitable for the present formulations. Suitable defoamers include, for example, PLURONIC® L-61 non-ionic surfactant (commercially available from BASF® Corporation) or PAT-COTE® 415 liquid defoamer (commercially available from Patco Specialty Chemicals Division, American Ingredients Company). The defoamer may be present in an amount up to about 10.0 percent by weight and more preferably present in an amount of about 0.001 to about 10.0 percent by weight, and most preferably, in an amount of about 0.01 to about 0.05 percent by weight.

OTHER ADDITIVES

Other additives such as bittering agents, dyes, tracers, or biocides may be added to the antifreeze/coolant solution.

EXPERIMENTAL EVALUATION

The following examples are presented to illustrate the claimed invention and are not intended to be otherwise limiting:

EXAMPLE 1

| Ingredient | Formula "A" with Aliphatic Carboxylic Acid with Molybdate and Hydrocarbyl triazole (Weight Percent) | Formula "B" with Aliphatic Carboxylic Acid (Weight Percent) |
|---|---|---|
| Ethylene Glycol | 93.56 | 93.76 |
| 2-ethylhexanoic Acid | 3.00 | 3.00 |
| Potassium Hydroxide 45% | 2.70 | 2.70 |
| Sodium Molybdate Dihydrate | 0.20 | 0.00 |
| Sodium Tolytriazole 50% | 0.50 | 0.50 |
| Defoamers | 0.04 | 0.04 |
| pH nominal | 8.5 | 8.5 |

In EXAMPLE 1, Formula "A" utilizing a monobasic aliphatic organic acid with low levels of molybdate and a hydrocarbyl triazole in ethylene glycol is compared to Formula "B" utilizing the same chemical constituents without the molybdate. The components can be combined in almost any order with reasonable mixing. Except for the molybdate, all compounds are liquids which facilitates preparation both in the laboratory and in production. These formulations were tested by the ASTM D1384 glassware test.

The results are as follows:

| Metal | Formula "A" with Aliphatic Carboxylic Acid with Molybdate and Hydrocarbyl triazole Weight Loss (mg/coupon) | Formula "B" with Aliphatic Carboxylic Acid Weight Loss (mg/coupon) | Passing |
|---|---|---|---|
| Aluminum | −6.4 | −4.7 | 30 |
| Iron | −1.1 | −0.7 | 10 |
| Steel | 0.3 | 0.1 | 10 |
| Brass | 3.3 | 3.7 | 10 |
| Solder 70/30 | 5.5 | 7.1 | 30 |
| Modine 95/5 | 12.6 | 93.0 | 30 |
| Copper | 2.0 | 1.2 | 10 |

The negative numbers represent weight gain. In this example, the small amount of added molybdenum allows Formula A to protect high lead solder while Formula B containing the aliphatic carboxylic acid alone does not protect the high lead solder. While Formula B can be used in limited passenger car applications, Formula A has broader utility for use in automobiles as well as heavy equipment, equipment utilizing diesel engines, and industrial uses.

EXAMPLE 2

| Ingredient | Formula "C" with Aliphatic Carboxylic Acid with Molybdate and Hydrocarbyl triazole (Weight Percent) |
|---|---|
| Propylene Glycol | 93.56 |
| 2-ethylhexanoic Acid | 3.00 |
| Potassium Hydroxide 45% | 2.70 |
| Sodium Molybdate Dihydrate | 0.20 |
| Sodium Tolytriazole 50% | 0.50 |
| Defoamers | 0.04 |
| pH nominal | 8.5 |

In EXAMPLE 2, Formula "C" utilizes a monobasic aliphatic organic acid with low levels of molybdate and a hydrocarbyl triazole; however, propylene glycol has been substituted for ethylene glycol.

The components can be combined in almost any order with reasonable mixing. Except for the molybdate, all compounds are liquids which facilitates preparation both in the laboratory and in production. These formulations were tested by the ASTM D1384 glassware test. The results are as follows:

| Metal | Formula "C" with Aliphatic Carboxylic Acid with Molybdate and Hyrocarbyl triazole Weight Loss (mg/coupon) | Passing |
|---|---|---|
| Aluminum | −3.8 | 30 |
| Iron | 2.8 | 10 |
| Steel | −2.8 | 10 |
| Brass | −1.5 | 10 |
| Solder 70/30 | −2.5 | 30 |

-continued

| Metal | Formula "C" with Aliphatic Carboxylic Acid with Molybdate and Hyrocarbyl triazole Weight Loss (mg/coupon) | Passing |
|---|---|---|
| Modine 95/5 | −23.9 | 30 |
| Copper | −0.7 | 10 |

The negative numbers represent weight gain. These results show that Formula "C" substituting propylene glycol or the ethylene glycol of Formula "A" passes the ASTM D1384 test even on high lead solder.

EXAMPLE 3

| Ingredient | Formula "A" with Aliphatic Carboxylic Acid with Molybdate and Hydrocarbyl triazole (Weight Percent) | Formula "D" with Darden's U.S. Pat. No. 4,647,392 with Sebacic Acid without Molybdate (Weight Percent) |
|---|---|---|
| Ethylene Glycol | 93.56 | Balance |
| Sebacic Acid | 0.00 | 0.30 |
| 2-ethylhexanoic Acid | 3.00 | 3.00 |
| Potassium Hydroxide 45% | 2.70 | 2.70 |
| Sodium Molybdate Dihydrate | 0.20 | 0.00 |
| Sodium Tolytriazole 50% | 0.50 | 0.50 |
| Defoamers | 0.04 | Present |
| pH nominal | 8.5 | 8.53 |

In EXAMPLE 3, Formula "A" utilizing a monobasic aliphatic organic acid with low levels of molybdate and a hydrocarbyl triazole in ethylene glycol is compared to Formula "D" based on Darden's U.S. Pat. No. 4,647,392 utilizing similar chemical constituents without the molybdate, but including sebacic acid.

These formulations were tested by the ASTM D1384 glassware test. The results are as follows:

| Metal | Formula "A" with Aliphatic Carboxylic Acid with Molybdate and Hydrocarbyl triazole Weight Loss (mg/coupon) | Formula "D" with Darden's U.S. Pat. No. 4,647,392 with Sebacic Acid without Molybdate Weight Loss (mg/coupon) | Passing |
|---|---|---|---|
| Aluminum | −6.4 | 2.9 | 30 |
| Iron | −1.1 | 0.5 | 10 |
| Steel | 0.3 | 0.1 | 10 |
| Brass | 3.3 | 1.8 | 10 |
| Solder 70/30 | 5.5 | 3.2 | 30 |
| Modine 95/5 | 12.6 | 91.4 | 30 |
| Copper | 2.0 | 1.5 | 10 |

The negative numbers represent weight gain. In this example, the small amount of added molybdenum allows Formula A to protect high lead solder. Compared to Formula "D" based on Darden's formulation, the present invention deletes sebacic acid, an aliphatic dicarboxylic acid and adds molybdenum with better results in ASTM D 1384 corrosion tests on high lead solder. Surprisingly, the performance of the single monocarboxylic acid is as good as the mono/dicarboxylic acid blend of Darden on aluminum in direct contrast to the teachings of Darden's U.S. Pat. No. 4,647, 392. The results of Formula "D" based on Darden's patent is almost identical to the results obtained using Formula "B".

EXAMPLE 4

A comparison study was conducted between the instant invention for an antifreeze composition as set forth in Formula "A" comprising a monobasic aliphatic carboxylic acid with molybdate and a hydrocarbyl triazole, and an ethylene glycol based antifreeze coolant composition, Formula "E", containing an ethylene glycol based dicarboxylic acid composition including sebacic acid and tolytriazole.

The acids were neutralized with sodium hydroxide to a pH of about 8.5. Formula "E" contained no molybdenum or inorganic additives and is similar to antifreeze composition derivatives set forth and described in British Standard TS10177 (Al39) from 1978.

Both the invention set forth in Formula "A" and the dicarboxylic acid Formula "E" met the requirements of ASTM D3306 and ASTM D4985 tests which encompass a battery of industry standard coolant corrosion tests, physical property tests, and performance tests.

The Ford BL2-2 engine dynamometer test was conducted under standard conditions on each coolant. In Table 1, the instant invention comprising the Formula "A" composition was compared to the Formula "E" composition. The tests were extended to 1728 hours, the equivalent of 120,000 miles of highway driving. The test is very stressful on engine coolants, often breaking them down in a standard 672 hour test.

Parameters for the test were as follows:

| | |
|---|---|
| Engine | 1.9 L Ford Escort |
| Radiator | Contour/Mystique |
| Speed | 2400 RPM (revolutions per minute) |
| Torque | 83 NM (28 BHP) |
| Cycle | 16 hours on, 8 hours off |
| Coolant | 45% |
| Radiator Input | 225° F. |
| Radiator Delta | 35° F. |

The corrosion coupon bundles were changed in 96 hour intervals and cleaned and weighed in accordance with ASTM D1384. Coupon averages less than 10 mg and single coupons under 30 mg are indicative of excellent performance. Trends in time can be significant. Outlyers can be disregarded. In each test, the engines ran properly and post test evaluation showed that the engine and cooling system components to be well protected with each coolant. The weight loss results of each test in mg/coupon are reported in Tables 1 and 2.

Table 1 shows the data resulting from a coupon weight test using the novel antifreeze composition as set forth in Formula "A" comprising a monobasic aliphatic organic acid with molybdate and a hydrocarbyl triazole under standard test conditions utilizing a Ford BL2-2 engine dynamometer test.

TABLE 1

Weight Loss (mg/coupon)  (−) = weight gain

| Hours | Copper | Solder | Brass | Steel | Cast Iron | Cast Aluminum |
|---|---|---|---|---|---|---|
| 96 | 180.9 | 0.4 | 5.0 | 1.0 | 2.8 | 1.6 |
| 192 | 58.3 | 2.0 | 10.7 | 1.4 | 2.6 | 13.0 |
| 288 | 14.3 | 1.8 | 15.0 | −0.1 | −0.4 | 9.5 |
| 384 | 6.4 | 7.7 | 5.9 | −0.4 | −0.4 | 32.6 |
| 480 | 4.4 | 7.0 | 3.9 | 0.2 | 1.0 | 31.3 |
| 576 | 0.9 | 8.5 | 0.8 | 0.3 | 1.4 | 35.5 |
| 672 | 1.9 | 14.7 | 1.1 | 0.0 | 1.2 | 23.8 |
| 0–672 | 38.2 | 6.0 | 6.1 | 0.2 | 1.2 | 21.0 |
| 768 | 0.4 | 22.3 | 0.6 | 0.5 | 0.3 | 35.3 |
| 864 | 1.2 | 5.6 | 3.0 | 0.0 | 1.1 | 28.4 |
| 960 | 2.8 | 6.6 | 3.5 | −0.1 | 1.8 | 16.8 |
| 1056 | 5.1 | 2.0 | 6.7 | 0.0 | 0.5 | 12.8 |
| 1152 | 4.6 | 1.9 | 4.5 | −0.3 | 0.6 | 11.5 |
| 1248 | 3.5 | 3.3 | 3.2 | −0.1 | 0.0 | 10.3 |
| 1344 | 1.9 | 1.4 | 4.0 | 0.6 | 0.5 | 9.2 |
| 672–1344 | 2.8 | 6.2 | 3.6 | 0.1 | 0.7 | 17.8 |
| 1440 | 1.8 | 1.4 | 3.0 | 1.4 | 1.4 | 4.1 |
| 1536 | 2.3 | 1.2 | 3.1 | 0.9 | 0.5 | 7.2 |
| 1632 | 2.3 | 1.5 | 2.8 | 1.2 | 0.9 | 3.4 |
| 1728 | 2.1 | 2.7 | 1.8 | 1.0 | 0.3 | 10.4 |
| 1440–1728 | 2.1 | 1.7 | 2.7 | 1.1 | 0.8 | 6.3 |
| 0–1728 | 16.4 | 5.1 | 4.4 | 0.4 | 0.9 | 16.5 |

Table 2 shows the data resulting from a Ford BL2-2 engine dynamometer test conducted under standard conditions using the ethylene glycol based antifreeze coolant composition Formula "E" utilizing an ethylene glycol based dicarboxylic acid composition including sebacic acid and tolytriazole.

TABLE 2

WEIGHT LOSS (mg/coupon)

Coupons

| Hours | Copper | Solder | Brass | Steel | Cast Iron | Cast Aluminum |
|---|---|---|---|---|---|---|
| 96 | 32.2 | 10.2 | 19.2 | −1.5 | −0.3 | 5.2 |
| 192 | 1.4 | 0.6 | 2.6 | −0.6 | 1.7 | 27.5 |
| 288 | 2.1 | 2.6 | 4.4 | −1 | 0.1 | 32.3 |
| 384 | 1.6 | 4.6 | 3.6 | −1.2 | 4.9 | 25.8 |
| 480 | 0.6 | 3.5 | 1.7 | −1.1 | −0.6 | 22.1 |
| 576 | 1.7 | 4.5 | 2.3 | 1.8 | 11.3 | 19.2 |
| 672 | 0.4 | 1.2 | 2.1 | −0.9 | 4.7 | 17.3 |
| 0–672 | 5.71 | 3.89 | 5.13 | −0.64 | 3.11 | 21.34 |
| 768 | 0.5 | 3.3 | 0.3 | 83.1 | 37.3 | 25.1 |
| 864 | 0.8 | 2.3 | 0.8 | −1.1 | 3.3 | 16.7 |
| 960 | −0.1 | 0.4 | −1.2 | −1.7 | 2.1 | 3.2 |
| 1056 | −0.2 | 2 | −0.1 | −1 | 2 | 14.9 |
| 1152 | −0.7 | 0.7 | 1.8 | −1 | −4.5 | 11.9 |
| 1248 | 0.1 | 4.2 | 2.2 | 0.7 | −1.7 | 10.1 |
| 1344 | 1.8 | 0 | 2.9 | 311.6 | 207.5 | 7.3 |
| 672–1344 | 0.31 | 1.84 | 0.96 | 55.80 | 35.14 | 12.74 |
| 1440 | 0.7 | 1.3 | 1.5 | −1 | 1.2 | 8.5 |
| 1536 | 2.5 | 0.1 | 2 | 251.2 | 235.6 | 16.7 |
| 1632 | −0.2 | 1.1 | 2.3 | 115.1 | 90.2 | 13.5 |
| 1728 | −0.8 | 2.2 | 1.4 | 274.3 | 202.6 | 9.7 |
| 0–1728 | 2.52 | 2.53 | 2.79 | 54.04 | 41.78 | 16.05 |

(−) = Weight Gain

EXPERIMENTAL RESULTS

As set forth in Tables 1 and 2, the data resulting from the Ford BL2-2 engine dynamometer test conducted under standard conditions, shows that Formula "A" containing the monobasic aliphatic organic acid with molybdate and a hydrocarbyl triazole exhibit superior long term performance on cast iron and steel than Formula "E" based on the ethylene glycol based dicarboxylic acid antifreeze coolant composition of Table 2 utilizing a dicarboxylic acid composition with tolytriazole.

The data from Table 1 shows that the Formula "A" composition passed the ASTM D1384 including high lead solder. The present invention utilizing a monobasic aliphatic organic acid with low levels of molybdate and a hydrocarbyl triazole in ethylene glycol gave high losses on copper, but passivated with time. This was also exhibited by the control coupon to a lesser degree and is common in this test. The corrosion coupon results of Table 1 also show that the instant invention containing a monobasic aliphatic organic acid with low levels of molybdate and a hydrocarbyl triazole has superior long term performance on cast iron and steel than the dicarboxylic acid based coolant as seen by the results set forth in Table 2. Although the ferrous metals in the engine were well protected using both formulas, the ability to protect new metal is reduced near the end of the test for Formula "E" containing the dicarboxylic acids as set forth in Table 2. This begins at about 1384 hours with losses of 311.6 on steel and 207.5 on cast iron. This level of loss continues for the duration of the test.

The test data clearly shows that the monocarboxylic acid, sodium molybdate and tolytriazole exhibits advantages over the dicarboxylic acid formula when used as an enhanced engine coolant in ethylene and propylene glycol based antifreeze for providing an extended lifetime in excess of 1728 hours.

EXAMPLE 5

The antifreeze Formula "A" composition of the present invention containing the monobasic aliphatic organic acid with molybdate and a hydrocarbyl triazole was also compared to the ethylene glycol based antifreeze coolant composition, Formula "E", containing an ethylene glycol based dicarboxylic acid composition including sebacic acid and tolytriazole in vehicle service tests.

Chrysler vans with the 5.9 liter (360 cu.in.) engines were tested in the Colorado rocky Mountains. The vehicles were used to transfer skiers between Denver International Airport and Vale, Colorado. the trip is 110 miles each way. The driving is mixed with highway and city inputs; however, idling in traffic is common. The vans operated eighteen (18) hours per day on and six (6) hours off, seven days a week. In three weeks, it is possible to accumulate 8,000 miles. Vans completing the test accumulated approximately 100,000 miles in roughly one year. Ten vans were operated on each test coolant.

Engines used in the test were either new or rebuilt. Cooling systems were flushed and cleaned with a chelator type cleaner prior to test fluid introduction. The copper radiators and heater cores had approximately 25,000 miles at test inception. Aluminum water pumps and timing covers were replaced. The test coolant was mixed 50% with tap water. A gallon of pre-diluted top off coolant was placed in each vehicle and care was taken to keep each vehicle properly topped off. Maintenance logs were kept for all vehicle repairs and concerns. Coolant samples of two (2) to four (4) ounces were taken at 8,000 mile intervals. Engines were removed, destructively evaluated and photographed at test end as shown in FIGS. 1 and 2.

For each coolant the engines and cooling system components were well protected from corrosion. No vehicles had operating problems; however, distress was observed in the water pumps of the vehicle engines containing the dicarboxylic acid Formula "E" based coolant in all cases.

As shown in FIG. 1, the engine water pumps and timing covers protected with the Formula "A" composition of the instant invention containing the monobasic aliphatic organic acid with molybdate and a hydrocarbyl triazole show the aluminum to be well protected with no pitting, blackening or corrosion being observed.

Figure 2:
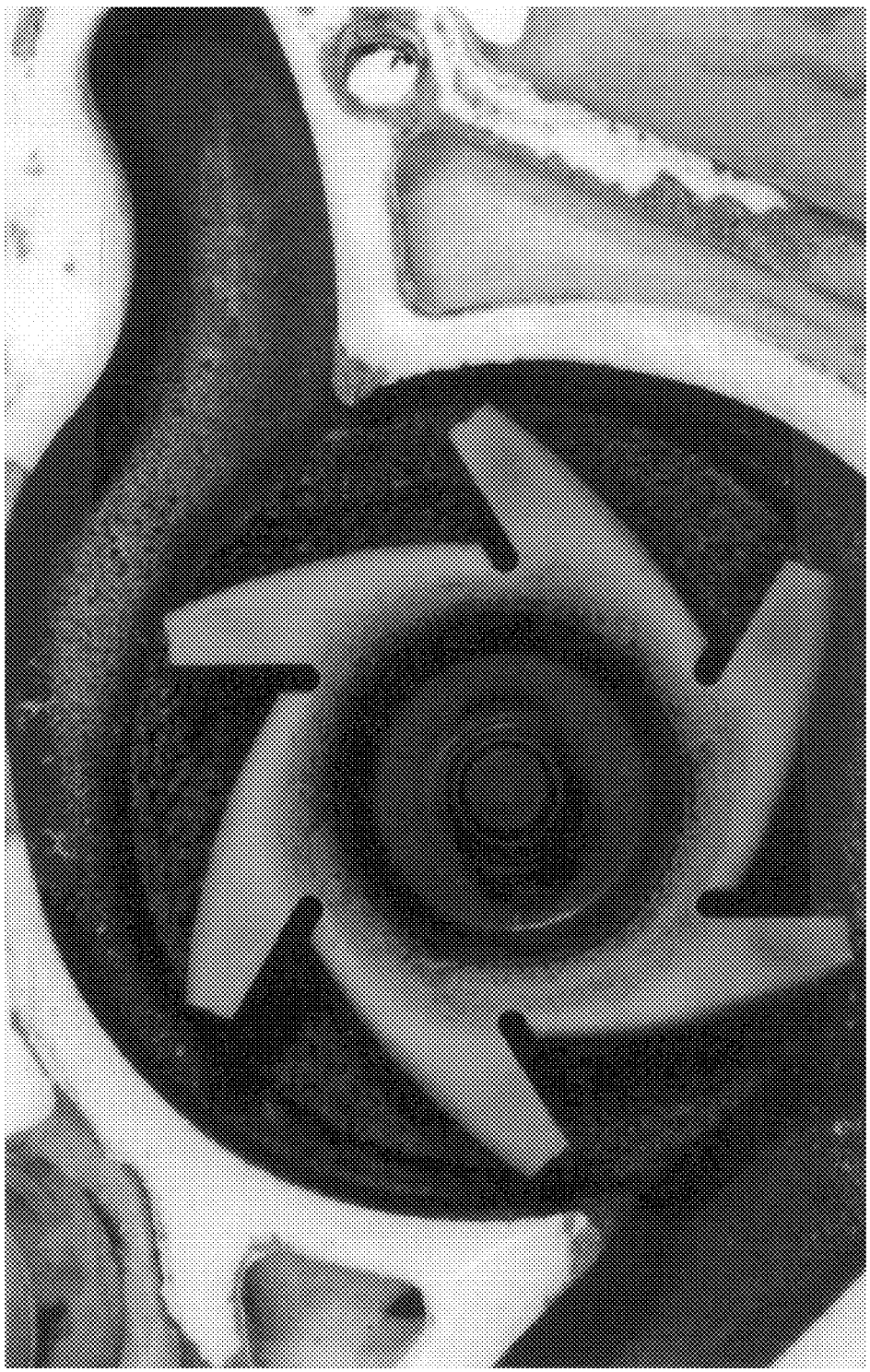
FIG. 2 shows the engine water pump and timing cover of the engine protected with the dicarboxylic acid based antifreeze Formula "E" showing darkened areas indicating cavitation erosion-corrosion.

As shown in FIG. 2, the aluminum of the engines protected with the Formula "E", dicarboxylic acid based formula was darkened with corrosion. The aluminum timing covers of the engines protected with the Formula "E" dicarboxylic acid based coolant showed similar cavitation erosion-corrosion.

These tests are indicative of anticipated problems with the performance of the engines associated with the dicarboxylic acid based coolant solutions. The results are important because at a higher milage the damaged pumps can be expected to leak and fail if not replaced soon thereafter. It is also anticipated that problems associated with volumetric efficiency will be experienced possibly causing over heating of the vehicles. Thus, the experiment further demonstrates the benefit and advantages exhibited by the Formula "A" composition comprising a monobasic aliphatic organic acid with molybdate and a hydrocarbyl triazole in preventing cavitation erosion-corrosion damage.

Modifications

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein. Reference to documents made in the specification is intended to result in such patents or literature cited are expressly incorporated herein by reference, including any patents or other literature references cited within such documents as if fully set forth in this specification.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

We claim:

1. A monocarboxylic acid based antifreeze composition comprising:
   a. a major amount of a water soluble liquid alcohol freezing point depressant:
   b. from about 0.1 to about 10.0 weight percent of an monobasic carboxylic acid compound or the alkali metal salt thereof;
   c. from about 0.01 to about 5.0 weight percent of an azole compound comprising at least three nitrogen atoms; and
   d. from about 0.001 to about 5.0 weight percent of a molybdate compound.

2. The monocarboxylic acid based antifreeze composition of claim 1, said monobasic carboxylic acid compound comprising an aliphatic monobasic acid or the alkali metal salt thereof.

3. The monocarboxylic acid based antifreeze composition of claim 1 wherein said monocarboxylic acid is selected from the acid group consisting of hexanoic, heptanoic, isoheptanoic, octanoic, 2-ethylhexanoic, nonanoic, decanoic, undecanoic, dodecanoic, neodecanoic, and/or combinations thereof.

4. The monocarboxylic acid based antifreeze composition of claim 1, wherein said major amount of a water soluble liquid alcohol freezing point depressant is selected from the group consisting of ethylene glycol, diethylene glycol, propylene glycol, dipropylene glycol, methyl alcohol, ethyl alcohol, propyl alcohol, and isopropyl alcohol, and combinations thereof.

5. The monocarboxylic acid based antifreeze composition of claim 1, wherein said molybdate compound is selected from the group consisting of sodium molybdate, potassium molybdate, lithium molybdate, ammonium molybdates, ammonium dimolybdate, ammonium heptamolybdate, sodium molybdate dihydrate, molybdenum trioxine, heteropolymolybdates, disodium salt dihydrate of molybdic acid, sodium molybdate $2H_2O$, molybdenum trioxide, silicoheteropolymolybdates, and phosphoroheteropolymolybdates.

6. The monocarboxylic acid based antifreeze composition of claim 1, wherein said azole compound is present in an amount of from between about 0.01 to about 1.0 weight percent.

7. The monocarboxylic acid based antifreeze composition of claim 1, wherein said molybdate compound is present in an amount of from between about 0.001 to about 1.0 weight percent.

8. The monobasic carboxylic acid based antifreeze composition of claim 1, wherein an alkali metal hydroxide or ammonium hydroxide is used to form the monobasic salt from the acid groups consisting of hexanoic, heptanoic, isoheptanoic, octanoic, 2-ethylhexanoic, nonanoic, decanoic, undecanoic, dodecanoic, neodecanoic, and/or combinations thereof.

9. The monocarboxylic acid based antifreeze composition of claim 1 including an effective amount of a defoamer.

10. The monocarboxylic acid based antifreeze composition of claim 1 including an effective amount of a dye.

11. The monocarboxylic acid based antifreeze composition of claim 1 including an effective amount of a buffering agent.

12. The monocarboxylic acid based antifreeze composition of claim 1 including an effective amount of a biocide agent.

13. The monocarboxylic acid based antifreeze composition of claim 1, said aliphatic monobasic carboxylic acid compound comprising a $C_3$–$C_{16}$ aliphatic monobasic acid or the alkali metal salt thereof.

14. A monocarboxylic acid based antifreeze composition comprising a corrosion inhibiting effective amount of:
   a. a major amount of a water soluble liquid alcohol freezing point depressant;
   b. a monobasic carboxylic acid compound or the alkali metal salt thereof;
   c. an azole compound comprising at least three nitrogen atoms; and
   d. a molybdate compound.

15. The monocarboxylic acid based antifreeze composition of claim 14, wherein said monobasic carboxylic acid compound or the alkali metal salt thereof is present in an amount of from about 0.1 to about 10.0 weight percent.

16. The monocarboxylic acid based antifreeze composition of claim 14, wherein said azole compound comprising at least three nitrogen atoms is present in an amount of from about 0.01 to about 5.0 weight percent.

17. The monocarboxylic acid based antifreeze composition of claim 14, wherein said molybdate compound is present in an amount of from about 0.001 to about 5.0 weight percent.

18. The monocarboxylic acid based antifreeze composition of claim 14, said monobasic carboxylic acid compound comprising an aliphatic monobasic acid or the alkali metal salt thereof.

19. The monocarboxylic acid based antifreeze composition of claim 18, said aliphatic monobasic carboxylic acid compound comprising a $C_3$–$C_{16}$ aliphatic monobasic acid or the alkali metal salt thereof.

20. The monocarboxylic acid based antifreeze composition of claim 14 wherein said monocarboxylic acid is selected from the acid group consisting of hexanoic, heptanoic, isoheptanoic, octanoic, 2-ethylhexanoic, nonanoic, decanoic, undecanoic, dodecanoic, neodecanoic, and/or combinations thereof.

21. The monocarboxylic acid based antifreeze composition of claim 14, wherein said major amount of a water soluble liquid alcohol freezing point depressant is selected from the group consisting of ethylene glycol, diethylene glycol, propylene glycol, dipropylene glycol, methyl alcohol, ethyl alcohol, propyl alcohol, and isopropyl alcohol, and combinations thereof.

22. The monocarboxylic acid based antifreeze composition of claim 14, wherein said molybdate compound is selected from the group consisting of sodium molybdate, potassium molybdate, lithium molybdate, ammonium molybdates, ammonium dimolybdate, ammonium heptamolybdate, sodium molybdate dihydrate, molybdenum trioxine, heteropolymolybdates, disodium salt dihydrate of molybdic acid, sodium molybdate $2H_2O$, molybdenum trioxide, silicoheteropolymolybdates, and phosphoroheteropolymolybdates.

23. The monocarboxylic acid based antifreeze composition of claim 14, wherein said azole compound is present in an amount of from between about 0.01 to about 1.0 weight percent.

24. The monocarboxylic acid based antifreeze composition of claim 14, wherein said molybdate compound is present in an amount of from between about 0.001 to about 1.0 weight percent.

25. The monobasic carboxylic acid based antifreeze composition of claim 14, wherein an alkali metal hydroxide or ammonium hydroxide is used to form the monobasic salt from the acid groups consisting of hexanoic, heptanoic, isoheptanoic, octanoic, 2-ethylhexanoic, nonanoic, decanoic, undecanoic, dodecanoic, neodecanoic, and/or combinations thereof.

26. The monocarboxylic acid based antifreeze composition of claim 14 including an effective amount of a defoamer.

27. The monocarboxylic acid based antifreeze composition of claim 14 including an effective amount of a dye.

28. The monocarboxylic acid based antifreeze composition of claim 14 including an effective amount of a buffering agent.

29. The monocarboxylic acid based antifreeze composition of claim 14 including an effective amount of a biocide agent.

30. The monocarboxylic acid based antifreeze composition of claim 14, wherein said azole compound is selected from the group consisting of tolytriazole, hydrocarbyl triazole, benzotriazole, mercaptobenzothizole, pyrazoles, isooxazoles, isothiazoles, thiazoles, thiadiazole salts, 1,2,3-benzotriazole, 1,2,3-tolyltriazole, sodium 2-mercaptobenzothiazole, and combinations thereof.

31. A monocarboxylic acid based antifreeze composition comprising a corrosion inhibiting effective amount of:
   a. a major amount of a water soluble liquid alcohol freezing point depressant;
   b. a monobasic carboxylic acid compound or the alkali metal salt thereof;
   c. an azole compound selected from the group consisting of tolytriazole, hydrocarbyl triazole, benzotriazole, mercaptobenzothizole, pyrazoles, isooxazoles, isothiazoles, thiazoles, thiadiazole salts, 1,2,3-benzotriazole, 1,2,3-tolyltriazole, sodium 2-mercaptobenzothiazole, and combinations thereof; and
   d. a molybdate compound.

32. The monocarboxylic acid based antifreeze composition of claim 31, wherein said monobasic carboxylic acid compound or the alkali metal salt thereof is present in an amount of from about 0.1 to about 10.0 weight percent.

33. The monocarboxylic acid based antifreeze composition of claim 31, wherein said azole compound is present in an amount of from about 0.01 to about 5.0 weight percent.

34. The monocarboxylic acid based antifreeze composition of claim 31, wherein said molybdate compound is present in an amount of from about 0.001 to about 5.0 weight percent.

35. The monocarboxylic acid based antifreeze composition of claim 31, said monobasic carboxylic acid compound comprising an aliphatic monobasic acid or the alkali metal salt thereof.

36. The monocarboxylic acid based antifreeze composition of claim 35, said aliphatic monobasic carboxylic acid compound comprising a $C_3$–$C_{16}$ aliphatic monobasic acid or the alkali metal salt thereof.

37. The monocarboxylic acid based antifreeze composition of claim 31 wherein said monocarboxylic acid is selected from the acid group consisting of hexanoic, heptanoic, isoheptanoic, octanoic, 2-ethylhexanoic, nonanoic, decanoic, undecanoic, dodecanoic, neodecanoic, and/or combinations thereof.

38. The monocarboxylic acid based antifreeze composition of claim 31, wherein said major amount of a water soluble liquid alcohol freezing point depressant is selected from the group consisting of ethylene glycol, diethylene glycol, propylene glycol, dipropylene glycol, methyl alcohol, ethyl alcohol, propyl alcohol, and isopropyl alcohol, and combinations thereof.

39. The monocarboxylic acid based antifreeze composition of claim 31, wherein said molybdate compound is selected from the group consisting of sodium molybdate, potassium molybdate, lithium molybdate, ammonium molybdates, ammonium dimolybdate, ammonium heptamolybdate, sodium molybdate dihydrate, molybdenum trioxine, heteropolymolybdates, disodium salt dihydrate of molybdic acid, sodium molybdate $2H_2O$, molybdenum trioxide, silicoheteropolymolybdates, and phosphoroheteropolymolybdates.

40. The monocarboxylic acid based antifreeze composition of claim 31, wherein said azole compound is present in an amount of from between about 0.01 to about 1.0 weight percent.

41. The monocarboxylic acid based antifreeze composition of claim 31, wherein said molybdate compound is present in an amount of from between about 0.001 to 1.0 weight percent.

42. The monobasic carboxylic acid based antifreeze composition of claim 32, wherein an alkali metal hydroxide or ammonium hydroxide is used to form the monobasic salt from the acid groups consisting of hexanoic, heptanoic, isoheptanoic, octanoic, 2-ethylhexanoic, nonanoic, decanoic, undecanoic, dodecanoic, neodecanoic, and/or combinations thereof.

43. The monocarboxylic acid based antifreeze composition of claim 31 including an effective amount of a defoamer.

44. The monocarboxylic acid based antifreeze composition of claim 31 including an effective amount of a dye.

45. The monocarboxylic acid based antifreeze composition of claim 31 including an effective amount of a buffering agent.

46. The monocarboxylic acid based antifreeze composition of claim 31 including an effective amount of a biocide agent.

* * * * *